United States Patent [19]

Evans

[11] Patent Number: 4,544,074
[45] Date of Patent: Oct. 1, 1985

[54] TAPERED AND FLANGED RUBBER STOPPER

[76] Inventor: Edward R. Evans, 13418 Halldale Ave., Gardena, Calif. 90249

[21] Appl. No.: 607,455

[22] Filed: May 7, 1984

[51] Int. Cl.[4] .............................................. B65D 39/04
[52] U.S. Cl. ..................................... 215/355; 220/307
[58] Field of Search ........................ 220/307; 217/110; 215/355

[56] References Cited

U.S. PATENT DOCUMENTS 3,162,411  12/1964  Duggan ............................... 220/307

FOREIGN PATENT DOCUMENTS 265104   9/1968  Austria ................................ 220/307
1383871  11/1964  France ................................ 220/307

Primary Examiner—Donald F. Norton
Attorney, Agent, or Firm—Harvey B. Jacobson

[57] ABSTRACT

A stopper for use as a closure in various applications comprises a cup-like member of flexible rubber or thermoplastic material. The stopper has an upper flange defining the stopper rim, a lower flange, a tapering nose portion beneath the lower flange forming the stopper base, and a wall portion between the flanges. The wall portion has an outer surface which tapers inwardly from the upper flange toward the lower flange at a specified angle. The tapered surface facilitates insertion of the stopper into an opening in a thin walled container for example, and allows the stopper to form an adequate seal in openings which are over- or undersize as compared to the nominal opening diameter, or which have other irregularities.

11 Claims, 5 Drawing Figures

TAPERED AND FLANGED RUBBER STOPPER

BACKGROUND OF THE INVENTION

This invention relates to stoppers made of flexible, resilient material, such as rubber or thermoplastic, for use as closures for diverse articles such as ceramic ware, art craft, shakers, piggy banks, bottles, beverage cans, thin-walled containers in general, and the like.

Stoppers of generally cylindrical form having spaced upper and lower outwardly projecting peripheral flanges or the like, and a right cylindrical outer wall portion between the flanges may be used, for example, in sealing an opening in a thin-walled container, wherein the stopper is snapped into the opening so that the flanges embrace the peripheral edge portion of the container wall defining the opening. With this arrangement, effective sealing of the opening, when required, is dependent, inter alia, upon the peripheral fit of the cylindrical wall portion of the stopper in the opening, and any discrepancies in diameter between the stopper and the opening, or any irregularities in same, may adversely affect the seal. Further, if the stopper wall portion is a tight fit in the opening, providing an effective seal, difficulty may be encountered in inserting and removing the stopper.

The present invention is directed toward providing a stopper of the kind described, in which, effective sealing in an opening is not critically dependent on the exact dimensions of the stopper and opening, so that the stopper may be fitted into over-or undersize openings, or openings with other irregularities, and which can be more easily inserted and removed.

STATEMENT OF PRIOR ART

The following U.S. patents relate to stoppers, but none of these discloses a stopper having the features of the present invention.
   U.S. Pat. No. 830,886,
   U.S. Pat. No. 1,630,805,
   U.S. Pat. No. 2,577,780,
   U.S. Pat. No. 2,644,453,
   U.S. Pat. No. 3,405,832.

SUMMARY OF THE INVENTION

Stoppers in accordance with the present invention, which are made of a flexible, resilient material such as rubber or thermoplastic, and which are generally of the kind previously described, are characterized in that the outer surface of the wall portion between the flanges is tapered inwardly from the upper flange toward the lower flange. Such tapering of the outer surface of the stopper between the flanges allows a stopper to provide an effective seal in openings having diameter discrepancies and/or irregularities, and also facilitates stopper insertion and removal. The angle of the taper from the vertical may be in the range of about 10° to 20° and is preferably about 12½°.

In a preferred embodiment of the invention, the stopper is of a hollow, cup-like form with the upper flange defining the rim of the stopper and the lower flange merging into a tapered nose portion forming the base of the stopper and which may have a conical or frusto-conical outer surface, and a part-spherical inner surface. Stoppers in accordance with the invention can be made in a wide range of diameters, heights, proportions, wall thicknesses, and the like.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF PREFERRED EMBODIMENT

Figure 1:
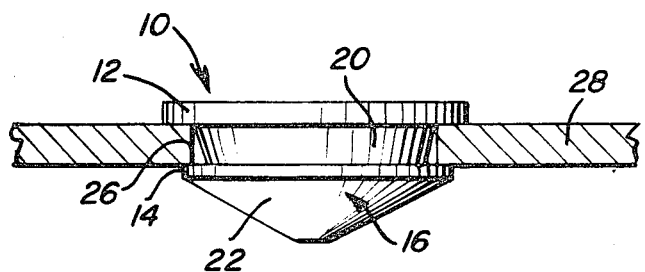
FIG. 1 is an elevational view of a stopper in accordance with the invention shown in position in an opening in a thin-walled container.
Figure 2:
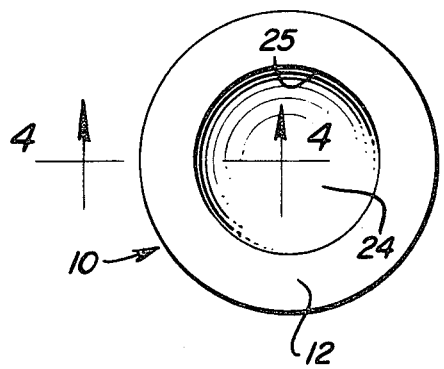
FIG. 2 is a plan view of the stopper.
Figure 4:
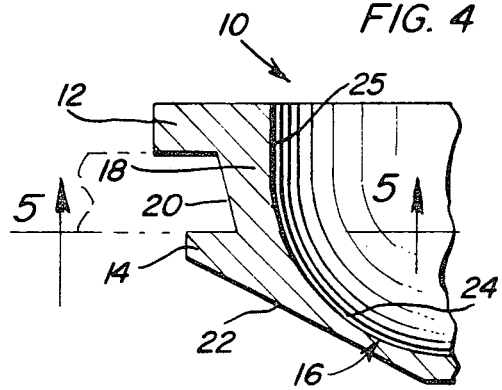
FIG. 4 is an enlarged sectional view on line 4—4 of FIG. 2.
Figure 3:
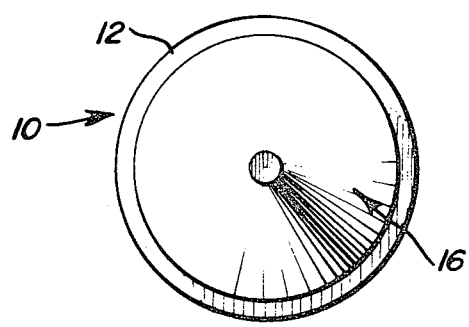
FIG. 3 is an underneath plan view of the stopper.
Figure 5:
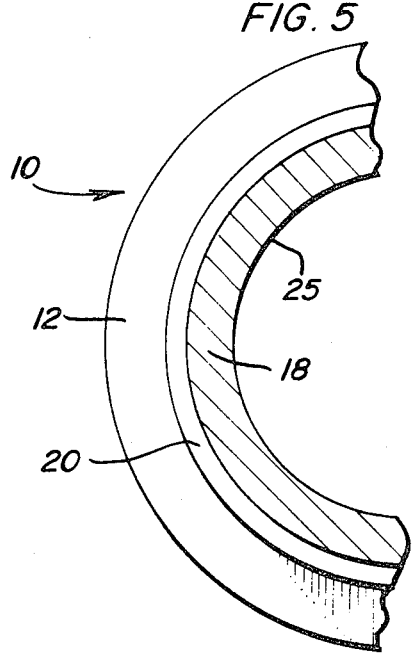
FIG. 5 is a sectional view on line 5—5 of FIG. 4.

A stopper 10 in accordance with the invention is of a hollow cup-like form molded either in soft rubber, a thermoplastic, or the like, and having an upper peripherally projecting flange 12 defining the rim of the stopper, a lower peripherally projecting flange 14 merging into a tapered nose portion 16 of the stopper, and a wall portion 18 between the flanges. It will be noted that outer surface 20 of wall portion 18 tapers inwardly from the upper flange toward the lower flange. The nose portion 16 may have a frusto-conical outer surface 22, and a part-spherical inner surface 24. Inner surface 25 of the upper portion of the stopper above flange 14 may be vertical or alternatively the entire inner surface of the stopper may be part spherical. The lower flange may be of smaller diameter than the upper flange.

As previously noted, the angle of taper of surface 20 to the vertical may be in the range of 10° to 20°, and is preferably about 12½°. The tapered surface 22 facilitates insertion and removal of the stopper with respect to an opening such as opening 26 in a thin-walled container 28, and the surface taper of surface 20 provides an effective seal in openings ranging in diameter within the diameter range of surface 20. For example, with stopper wall portion 18 having a height of 3/16", and surface 20 being tapered at 12½° to the vertical, the stopper can provide an effective seal in openings having a diameter variance of up to 1/16".

Lower flange 14 may have a diameter just overlapping the edge of container 28 defining opening 26, to facilitate insertion and removal of the stopper, while the larger diameter of upper flange 12 facilitates manipulation of the stopper.

Stoppers in accordance with the invention may be made to fit a wide variation of nominal opening sizes, for example ranging from openings of about ⅜" diameter to openings of about 2" diameter. Also, the overall height of the stopper, its proportions and shape may vary from those illustrated. For example, stoppers ranging in diameter from about ⅜" to 2" may all have a wall portion 18 of 3/16" in height, which is found to be particularly suited to this size range of stoppers. Typical wall thicknesses may be in the range 0.050" to 0.065".

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A stopper of flexible resilient material comprising an upper peripherally projecting flange, a lower peripherally projecting flange, and a frusto-conical outer wall surface between the flanges tapering inwardly from the upper flange toward the lower flange, and extending all of the way from the bottom of the upper flange to the top of the lower flange, wherein the stopper is of hollow cup-like form with the upper flange defining a rim thereof and the lower flange merging into a closed tapered nose portion of the stopper.

2. The invention of claim 1 wherein the lower flange is of smaller diameter than the upper flange.

3. The invention of claim 1 wherein the nose portion has a part-spherical inner surface, and the stopper has a vertical inner surface above the lower flange merging into the part-spherical surface.

4. The invention of claim 1 wherein the frusto-conical outer wall surface tapers at an angle to the vertical of between about 10° and 20°.

5. The invention of claim 4 wherein the angle of taper is about $12\frac{1}{2}°$.

6. The invention of claim 5 wherein the height of the frusto-conical outer wall surface is about 3/16" and the nominal diameter thereof is in the range $\frac{3}{8}$" to 2".

7. A molded hollow cup-like stopper of soft material such as rubber, thermoplastic, and the like comprising an upper peripherally projecting flange defining a rim of the stopper, a lower peripherally projecting flange, a tapered nose portion forming the base of the stopper extending below the lower flange, and a frusto-conical wall connecting said flanges, wherein the frusto-conical wall has an outer surface tapered inwardly from the upper flange toward the lower flange at an angle to the vertical in the range of about 10° to 20° and extending all of the way between the flanges so that the stopper may be used as a closure in openings having a variation in nominal diameter within a diameter variation of said surface.

8. The invention of claim 7 wherein the angle of taper of said surface is about $12\frac{1}{2}°$.

9. The invention of claim 8 wherein said wall has a vertical inner surface.

10. The invention of claim 9 wherein the vertical inner surface merges into a part-spherical inner surface in the nose portion of the stopper.

11. The invention of claim 7 wherein the lower flange is of smaller diameter than the upper flange.

* * * * *